United States Patent
Lu et al.

(10) Patent No.: US 7,432,319 B2
(45) Date of Patent: Oct. 7, 2008

(54) PROCESS FOR MAKING EXFOLIATED POLYOLEFIN/CLAY NANOCOMPOSITES

(76) Inventors: Honglan Lu, 103 Biloxi St., Port Lavaca, TX (US) 77979; Zhongyang Liu, 600 Village Rd., Apt. 4002, Port Lavaca, TX (US) 77979; Chih-Jian Chen Chen, 117 Timberline Dr., Port Lavaca, TX (US) 77979; Youliang Hu, #402-508 Kexueyuan, Datunlu, Beijing 100101 (CN); Yingying Lu, 910 Cricklewood Dr., Apt. 326, State College, PA (US) 16803; Yucai Ke, #301-814 Building, Zhongguancun, Beijing 100080 (CN); Cunyue Guo, 80 Zhonnguancun East Road, Beijing 100080 (CN)

( * ) Notice: Subject to any disclaimer, the term of this patent is extended or adjusted under 35 U.S.C. 154(b) by 249 days.

(21) Appl. No.: 11/288,623

(22) Filed: Nov. 29, 2005

(65) Prior Publication Data

US 2007/0123630 A1 May 31, 2007

(51) Int. Cl.
*C08K 3/34* (2006.01)

(52) U.S. Cl. .................. 524/445; 524/447; 524/449; 524/789; 524/790; 524/791

(58) Field of Classification Search .................. 524/445, 524/447, 449, 789, 790, 791
See application file for complete search history.

(56) References Cited

U.S. PATENT DOCUMENTS

| 5,973,053 | A | 10/1999 | Usuki et al. |
| 6,462,122 | B1 | 10/2002 | Qian et al. |
| 6,613,711 | B2 | 9/2003 | Zhang et al. |
| 6,632,868 | B2 | 10/2003 | Qian et al. |
| 6,646,072 | B2 | 11/2003 | Klendworth et al. |
| 6,838,508 | B2 | 1/2005 | Hsiao et al. |
| 6,864,308 | B2 | 3/2005 | Rosenthal et al. |
| 6,872,791 | B1 | 3/2005 | Lee et al. |
| 7,129,287 | B1 * | 10/2006 | Lee et al. ................... 524/445 |
| 2005/0014905 | A1 | 1/2005 | Chung et al. |

FOREIGN PATENT DOCUMENTS

WO WO 99/47598 A1 9/1999
WO WO 01/30864 A2 5/2001

OTHER PUBLICATIONS

Arimitsu Usuki, et al., Synthesis of Nylon 6-Clay Hybrid, J. Mater. Res., May 1993, 1179-84, vol. 8, No. 5.
Yoshitsugu Kojima, et al., Mechanical Properties of Nylon 6-Cly Hybrid, J. Mater. Res., May 1993, 1185-89, vol. 8, No. 5.
Richard A. Vaia, et al., Synthesis and Properties of Two Dimensional Nanostructures by Direct Intercalation of Polymer Melts . . . , Chem. Mater., 1993, 1694-96, Vo. 5, No. 12.
Makoto Kato, et al., Synthesis of Polypropylene Oligomer-Clay Intercalation Compounds, J. Applied Poly. Sci., 1997, 1781-85, vol. 66.
Naoki Hasegawa, et al., Preparation and Mechanical Properties of Polypropylene-Clay Hybrids Using a Maleic Anhydride-Modified . . . , J. Applied Poly. Sci., 1998, 87-92, vol. 67.
Jeffrey S. Bergman, et al., Synthesis and Characterization of Polyolefin-Silicate Nanocomposites: a Catalyst Intercalation and . . . , Chem. Commun., 1999, 2179-80.
Peter Reichert, et al., Poly(propylene)/Organoclay Nanocomposite Formation: Influence of Compatabilizer Functionality and . . . , Macromol. Mater. Eng., 2000, 8-17, vol. 275.
A. Oya, et al., Factors Controlling Mechanical Properties of Clay Mineral/Polypropylene Nanocomposites, J. Mater. Sci., 2000, 1045-50, vol. 35.
Jeffrey W. Gilman, et al., Flammability Properties of Polymer-Layered Silicate Nanocomposites. Polypropylene and Polystyrene . . . , Chem. Mater., 2000, 1866-73, vol. 12.
Ruijian Xu, et al., New Biomedical Poly(urethane urea)-Layered Silicate Nanocomposites, Macromolecules, 2001, 337-39, vol. 34.
Pralay Maiti, et al., Influence of Crystaliization on Intercalation, Morphology, and Mechanical Properties of Polypropylene/Clay . . . , Macromolecules, 2002, 2042-49, vol. 35.
Petr Svoboda, et al., Morphology and Mechanical Properties of Polypropylene/Organoclay Nanocomposites, J. Applied Poly. Sci., 2002, 1562-70, vol. 85.
International Search Report dated Dec. 21, 2007 for corresponding PCT Patent Application No. PCT/US2006/045094.

* cited by examiner

Primary Examiner—Edward J Cain
(74) Attorney, Agent, or Firm—Howrey LLP

(57) ABSTRACT

Processes are disclosed relating to modifying clays with an olefinic functionalized surfactant containing a chain end polymerizable double bond, and to treating the thus modified organoclay with an olefin polymerization catalyst precursor, and polymerizing an olefin in the presence of the thus treated organoclay and an organoaluminum cocatalyst.

19 Claims, 2 Drawing Sheets

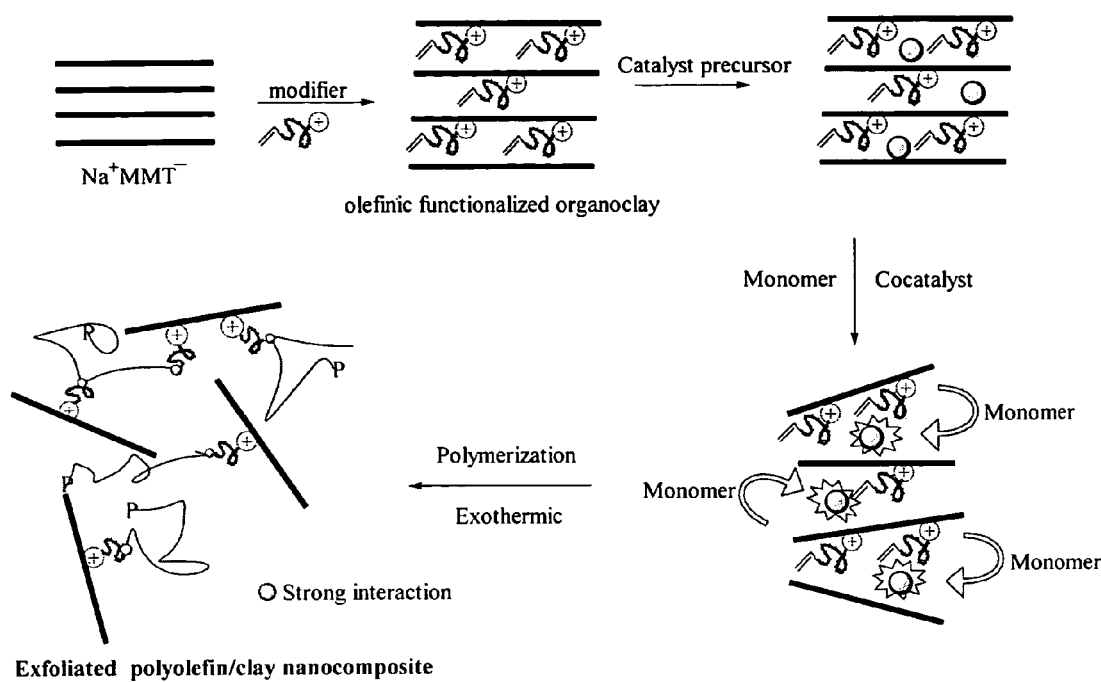
Figure 1. Schematic illustration of a process for making polyolefin/clay nanocomposites in accordance with one aspect of the present invention.

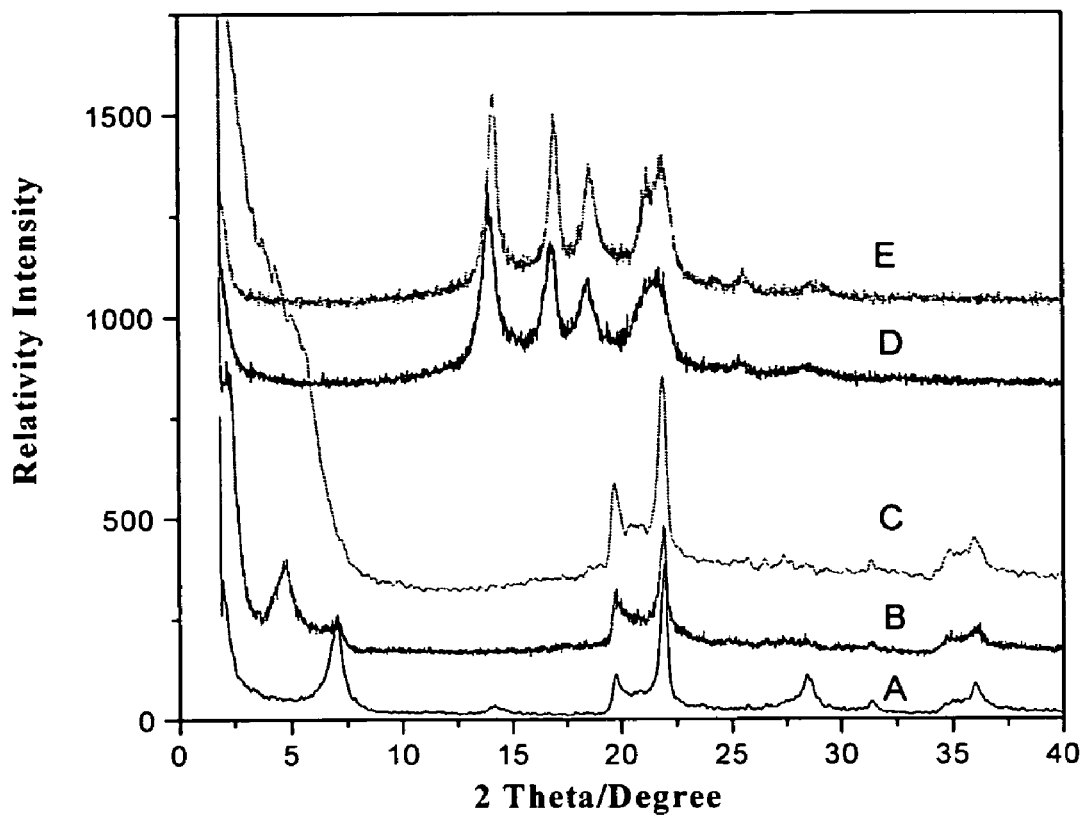
Fig.2. X-ray diffraction pattern of
(A). Pristine clay
(B). Olefinic functionalized organoclay.
(C). Treated organoclay with Ziegler-Natta catalyst precursor.
(D). Polypropylene/clay nanocomposite of Example 3
(E). Polypropylene/clay nanocomposite film of Example 3

PROCESS FOR MAKING EXFOLIATED POLYOLEFIN/CLAY NANOCOMPOSITES

BACKGROUND OF THE INVENTION

Field of the Invention Statement

The present invention relates to a process for exfoliating clay into polyolefins to form polyolefin/clay nanocomposites. In particular, the invention relates to modifying clays with an olefinic functionalized surfactant containing a chain end polymerizable double bond, and to treating the modified organoclay with an olefin polymerization catalyst precursor and polymerizing an olefin in the presence of an organoaluminum cocatalyst and the treated organoclay.

Polyolefins are widely used as one of the most important family of commercial polymers and have a unique combination of properties. These properties include low density, good processability, recyclability, and a broad range of mechanical properties. However, the applications for these polymers are generally limited to the low-end commodity market. It is desired that certain properties such as stiffness/impact strength, melt strength, heat resistance, and stress crack resistance be further improved to expand the application of polyolefins to high-end value added market, i.e., engineering plastics.

Inorganic fillers, such as talc, mica, etc., are widely used to improve these mechanical properties of polyolefin materials, but their use has not generally achieved these desired properties without a concomitant loss of toughness. The filler incorporation frequently results in poor dispersions in which particles of the inorganic fillers form multi-layered aggregates. This is generally due to incompatibility between polyolefin matrixes and conventional fillers and occurs regardless of the in-situ polymerization processes and/or melt mixing processes used. It would be desirable to obtain compositions comprising polyolefin and phyllosilicate, hereinafter "clay," with the clay dispersed on a nanoscale.

Polymer/clay nanocomposites have recently attracted interest. Enhancements of many properties of polymeric materials can potentially be achieved by the nanodispersion of inorganic silicate layers within a polymer matrix. Property improvements that have not been achieved by conventional composites are considered possible in nanoscale materials. These property improvements include increased thermal properties, heat resistance, tensile strength, flex modulus, impact strength, toughness, general flame-retardant characteristics, and barrier properties. These nanoclays can have improved dispersibility in the polymer matrix due to their platelet structure. As a result, the size of the filler particle, when dispersed, is on a nanoscale such that property enhancement can be achieved at much lower filler levels compared to traditional filler incorporation.

Clay dispersed on a nanoscale in polymer may have a mixed morphology, with both intercalated and exfoliated structure existing in the polymer/clay system. The intercalated structure is well-self-assembled as the clay platelets are separated just enough that polymer can insert into the gallery space between parallel individual silicate layers. The exfoliated structure can form when parallel individual silicate layers further separate to such extent that the individual silicate layers are no longer close enough to interact with each other. The silicate clay layers may be considered to be well-dispersed in the polymers if exfoliated structure is substantially achieved. The property improvement of the polymer/clay nanocomposite largely depends on the degree of exfoliation of the nanoclay. Achievement of the exfoliated structure is typically attempted by extensive melting mixing in an extruder or other device or by in-situ polymerization processes or by some combination of melt mixing or in-situ polymerization processes.

Obtaining these polymer/clay nanocomposites has heretofore been more feasible in hydrophilic polymer/clay systems due to the miscibility of the clay, with its hydrophilic polar surfaces, and polar polymers, such as nylon, PEO, PVA, and the like. Organically modified clays, have been extensively attempted to enhance the performance of olefin polymers and overcome the problems heretofore observed when conventional fillers, such as talc and calcium carbonate, are used with polyolefins. Dispersing the hydrophilic silicate clay in hydrophobic polyolefins has been a technical challenge. Efforts to make clay miscible with non-polar hydrophobic polyolefins have focused on chemically modifying the inorganic clay by exchanging the alkali counterions with cation-organic surfactants, such as alkylammoniums, to form organophilic clay, and/or chemically modifying non-polar polyolefins with functional polar groups.

Surfactants have the potential to modify the clay. Hydrophilic surfaces can become hydrophobic surfaces by cation-exchange of the cation ($Na^+$, $Ca^{2+}$, etc.) between clay interlayers with onium ions of the surfactant. Surfactants can also expand the clay's tight interlayer structure by increasing (001) d-spacing between the parallel layers.

Both melt mixing and in-situ polymerization processes have been used in attempts to make polyolefin/clay nanocomposites by dispersing inorganic layered materials as nanoscale layers in polyolefin matrixes. Melt mixing and solution intercalation of organically modified silicate clay into polyolefin matrixes has attracted attention. Ideally, if the clay surfaces were sufficiently compatible with the polyolefin polymer matrix, the polymer would enter into the interlayer gallery space to form intercalated structure and subsequently to form an exfoliated nanocomposite under extensive mechanical shear or chemical force. Unfortunately, the concentration of organic component that can be used in the modified clay (organoclay) has heretofore been limited. As the organic concentration increases, the thermal stability of the organoclay in high temperature melt mixing processes becomes problematic. Similarly, the use of modified polyolefins in melt mixing processes is not without its problems. Maleic anhydride modified polypropylene has been widely investigated to make polypropylene/clay nanocomposites. Other functionalized polyolefins have also been used in attempts to make polyolefin/clay nanocomposites. Unfortunately, the size of functional polyolefins is too large to feasibly get into the tight galleries between the clay layers. Thus, effective intercalation and subsequent exfoliation even under intensive shear force are not achieved. In addition, the availability of functional polyolefins is very limited and methods to make them are very complicated and often involve severe side reactions, including chain cession. As a result of all these issues, existing methodologies often result in only a small portion of exfoliated structure with significant other portions consisting of intercalated structure and agglomerated tactoids. Undesirable re-stacking of the nanoclay platelets after melting extrusion process is also often observed. As a result, the property improvements are far below expectations. Thus, the miscibility issue between clay and polyolefins still remains largely unsolved.

As an alternative to the melting mixing process, in-situ polymerization processes have also been attempted to make polyolefin/clay nanocomposites. This involves intercalation of silicate clay by an olefin catalyst system, such as Ziegler-Natta or metallocene catalyst, followed by the polymerization of olefin in the presence of the clay. Theoretically, in-situ polymerization has the potential to overcome entropic and enthalpic barriers associated with intercalating nonpolar (hydrophobic) polyolefin with polar (hydrophilic) silicate clays if the polymer forms through in-situ polymerization of olefin monomers within the gallery between the layers of the clay. However, when either Ziegler-Natta catalysts or metallocene catalysts are used, the strongly hydrophilic nature of layered silicate can have deleterious effects on the catalyst activity and the yield of olefin intercalation polymerization. The use of modified clays has also been problematic as the modified clays themselves can also have a detrimental effect on polymerization. Various methods attempted to overcome activity concerns have been either too complicated to be practical, too time-consuming, and/or too expensive.

To date, the degree of improvement in polyolefin/clay nanocomposites using either melt mixing processes and/or in-situ polymerization using modified clays or modified polymers has not been as great as desired. In-situ polymerization processes attempted have been characterized by catalysts with low activity or other disadvantages. Moreover, the intercalation during the in-situ polymerization still cannot efficiently separate the individual silicate layers to form the exfoliated structure in the polyolefin matrixes due to immiscibility between non-polar polyolefin and the clay, even when the clay is a modified "organoclay." Furthermore, even when exfoliated clay platelets have been obtained, the clay platelets have heretofore not been phase and thermally stable. The nanoclay layers are subject to re-stacking and agglomeration problems during post-polymerization processing, including melt extrusion or molding processes. In-situ polymerization of functional polymers, either alone or in combination with the polymerization of unmodified polyolefins, has also not overcome the restacking problem.

Therefore, exploration of improved methods for making polyolefins/clay nanocomposites with substantially exfoliated structure and thermal and phase stability during post-polymerization processes continues.

SUMMARY OF THE INVENTION

The present invention relates to a process for exfoliating clay into polyolefins to form polyolefin/clay nanocomposites. In particular, the invention relates to modifying clays with an olefinic functionalized surfactant containing a chain end polymerizable double bond, and to treating the thus modified organoclay with an olefin polymerization catalyst precursor, and polymerizing an olefin in the presence of the thus treated organoclay and an organoaluminum cocatalyst.

One method of the present invention for making exfoliated polyolefin/clay nanocomposite comprises: contacting clay with a chain end double bond functionalized surfactant to form an olefinic functionalized organoclay; treating the olefinic functionalized organoclay with an olefin polymerization catalyst precursor; and polymerizing at least one olefin in the presence of the treated organoclay and an organoaluminum cocatalyst, and optionally also in the presence of an electron donor.

In one such method, a surfactant is employes having the formula

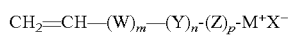

where M is an onium moiety that has ion-exchange capability with alkali ions on the layer surface of inorganic clays; X is an anion; W is a repeating unit selected from $CH_2$, CRR', cyclic, and aromatic species, where R and R' are independently selected from hydrogen and hydrocarbon groups; m is between 1 and about 1000; Y is a repeating unit selected from hydrocarbon and functionalized hydrocarbon groups; n is between 0 and about 5; Z is-a repeating unit selected from —$CH_2$, CR"R'", cyclic, and aromatic species, where R" and R'" are independently hydrogen, hydrocarbon groups, or functionalized hydrocarbon groups; p is between 1 and about 20; and (m+n+p) is greater than 2.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 depicts a schematic illustration of a process for making polyolefin/clay nanocomposites in accordance with one aspect of the present invention.

FIG. 2A depicts an X-ray diffraction pattern of pristine clay before modification in accordance with one aspect of the invention.

FIG. 2B shows an X-ray diffraction pattern of a modified olefinic functionalized organoclay that has been obtained by a process in accordance with one aspect of the invention.

FIG. 2C shows an X-ray diffraction pattern of an organoclay that has been treated with a Ziegler-Natta catalyst precursor in accordance with one aspect of the invention.

FIG. 2D shows an X-ray diffraction pattern of a polyolefin/clay nanocomposite obtained via in-situ polymerization in accordance with one aspect of the invention.

FIG. 2E shows an X-ray diffraction pattern of polyolefin/clay nanocomposite film of Example 3 obtained after post-molding processing in accordance with one aspect of the invention.

DESCRIPTION OF PREFERRED EMBODIMENTS

The present invention relates to a process for exfoliating clay into polyolefins to form polyolefin/clay nanocomposites. In particular, the invention relates to modifying clays with an olefinic functionalized surfactant containing a chain end polymerizable double bond, and to treating the thus modified organoclay with an olefin polymerization catalyst precursor and polymerizing an olefin in the presence of the thus treated organoclay and an organoaluminum cocatalyst.

In accordance with one aspect of the present invention, clay is modified to render it more organophilic and thus more compatible with polyolefins. This is accomplished using a surfactant that can chemically bond with inner layers of the clay and/or has ion-exchange capability with alkali ions on the layers of the clays. Such surfactants include, but are not limited to, surfactants represented by the following structural formula (A):

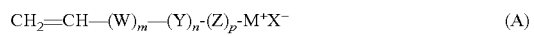
(A)

M is an onium moiety that has ion-exchange capability with alkali ions on the layer surface of inorganic clays. Acceptable onium moieties (M) include ammonium, sulfonium, phosphonium, and oxonium species of the structure $C^+(R^1)_a(R^2)_b(R^3)_c$, where C is nitrogen, sulfur, phosphorus, or oxygen; $R^1$, $R^2$ and $R^3$ are independently selected from hydrogen, hydrocarbon, and functionalized hydrocarbon species. $R^1$, $R^2$ and $R^3$ are preferably alkyl and/or aryl, and even more preferably alky. The subscripts a, b, and c are numbers from 0 to 3 with (a+b+c)<=3. Acceptable $C^+(R^1)_a(R^2)_b(R^3)_c$ cationic functional groups include, but are not limited to, $-N^+H(CH_3)_2$, $-N^+H_2(CH_3)$, $-N^+(CH_3)_3$, $-N^+(CH_3)(C_2H_5)_2$, $-S^+(CH_3)_2$, $-P^+(CH_3)_3$, and $-O^+(CH_3)_2$. Acceptable onium moieties (M) also include heterocyclic onium moieties. Acceptable heterocyclic onium moieties (M) include, but are not limited to, imidazolinium, pyridium, pyrrolidinium, pyrrolium, pyrazolium, triazolium, pyrimidinium, pyridazinium, pyrazinium, trizinium, indolium, indazolium, benzimidazolium, quinolinium, isoquinollinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium.

$X^-$ is an anion, with halides, including $Cl^-$, $Br^-$, and $I^-$, being preferred. W is a repeating unit selected from $-CH_2-$, $-CRR'$, non-aromatic cyclic, and aromatic species, where R and R' are independently hydrogen and hydrocarbon groups. The repeating unit W may have additional functional substitution; however, any such functional substitution, because of the proximity to the double bond, should be chosen to avoid poisoning the polymerization catalyst or otherwise adversely affecting the incorporation of the organoclay into the polymer chain. Preferably, there is no additional functional substitution of the repeating unit W. The number m is between 1 and about 1000. Y is either hydrocarbon repeating unit or functionalized hydrocarbon repeating unit. Acceptable functional groups include, but are not limited to, hydroxyl, carbonyl, carboxyl, and ether groups. Acceptable and desirable Y repeating unit species include, but are not limited to, $CH_2$, $CH_2-CH(OH)-CH_2$, $CH_2-(CO)-CH_2$, $CH_2-(COO)-CH_2$, and $CH_2-O-CH_2$. The number n is between 0 and about 5. Z is a repeating unit selected from $-CH_2-$, $-CR''R'''$, non-aromatic cyclic, and aromatic species, where R'' and R''' are independently hydrogen, hydrocarbon groups, or functionalized hydrocarbon groups. The number p is between 1 and about 20. Preferably, the values of m, n, and p in the formula (A) in the olefinic functionalized surfactant should be such that (m+n+p) is greater than 2, preferably not less than 3.

Combinations of surfactants can be used. Desirably, when more than one surfactant is used, all surfactants are of the formula A.

The invention also relates to clay-filled polyolefin/clay nanocomposites prepared in accordance with a method of the present invention. Processes of the present invention result in a polyolefin/clay nanocomposites having an exfoliated structure. Desirably, the resulting polyolefin/clay nanocomposites exhibit substantially exfoliated structure. The exfoliated structure in the polyolefin/clay nanocomposite provided in accordance with this invention is both phase and thermally stable. Reversion to the intercalated structure by reorganization and agglomeration in post-polymerization processes is minimized and preferably substantially absent. The nanoclay layers are homogeneously dispersed in the polyolefin matrix. Re-stacking of the layers during melt extruder processing is minimized as the nanoclay layers with chain-end double bond are directly copolymerized with the olefin. This represents an improvement over the prior art, where only minimal formation of exfoliated structure was obtainable and where such exfoliated structure was commonly transient and subject to reversal in post-polymerization processing.

Thus, one aspect of the present invention involves the use of a potentially co-polymerizable organophilic clay, e.g., montmorillonite, which has been functionalized with chain end double bond surfactant by treating clay with surfactant represented by the formula A described above. The resulting olefinic functionalized organoclay is compatible with and, due to the presence of the carbon-carbon double bond, can be copolymerized with olefin monomer(s). The polymerization results in the formation of a polyolefin/clay nanocomposite in-situ with nanoclay layers chemically bonded to the polymer. Because the nanoclay layers are chemically bonded to the polyolefin chains, individual layers of the clay are no longer close enough to interact with each other. As a result, a polyolefin/clay nanocomposite with exfoliated structure can be achieved. Desirably, a polyolefin/clay nanocomposite with substantially exfoliated structure is formed by the process. This stable disorder state (exfoliated structure) can be maintained in post-polymerization processes.

The modification of inorganic clay with the olefinic functionalized surfactant containing chain-end double bond results in expanded gallery space between clay layers. Consequently, this modification can, depending on the olefin polymerization catalyst system used, facilitate entry of preformed catalyst precursor into the gallery space or in-situ formation of the catalyst precursor inside the gallery. This modification also makes the inorganic clay more organophilic and can insulate the catalyst components from poisonous surfaces of the clay layers. The incorporation of catalyst components, e.g., preformed catalyst precursor or in-situ formation of catalyst precursor, further expands the gallery space to allow entry of monomer(s) and cocatalyst during polymerization. As a result, polymerization can occur within the gallery space. Such factors as the copolymerization of the olefinic functionalized organoclay with olefin, formation of polymeric macromolecules inside the gallery, along with reaction heat, can all contribute to the exfoliation and well-dispersion of the nanoclay layers in the polymer matrix.

A concern with having clay present during the polymerization is that the clay can have a detrimental effect on the activity of olefin polymerization catalysts. To reduce the likelihood of deterioration of catalyst activity and other advantageous characteristics of the polyolefin catalyst, it is desirable to insulate the catalyst from the poisonous surface of the clays. Thus, in accordance with one aspect of the present invention, the functional group M of the olefinic functionalized surfactant containing a chain end polymerizable double bond should be capable of chemically and/or physically interacting with the surface of the clay, which allows the relatively hydrophobic surfactant to be attached on the surface of the clay layers.

Such a surfactant also desirably provides sufficient chain length to form an insulating layer on the surface of the clay. Similar to the effects of the clay surface, the functional group M may poison polymerization catalysts if they are free. Thus, in accordance with one aspect of the present invention, the functional group M is immobilized by the clay layers. Accordingly, their potentially poisonous reactivity toward the olefin polymerization catalysts can be reduced. Even bound to the clay surface, a relatively weak interaction may exist between the functional group M and active catalyst sites. As such, the surfactants locate the functional group M, and consequentially the clay surface, further away from the olefin double bond. In addition, the surfactant provides space between the polymerizable double bond and the functional group M that is also desirable for efficient incorporation of the chain end double bond functionalized organoclay into the polymer structure.

The chain end double bond functionalized organoclay copolymerizes with olefin in the presence of olefin polymerization catalysts to form a functionalized polyolefin with chain end clay composition. This separates the nanoclay layers away from each other, thereby forming a well-exfoliated structure. This stable disorder state can be maintained in post-polymerization processing, including processing involving mixing with unmodified polyolefin that is compatible with the backbone of the chain end functionalized polyolefin/clay nanocomposite of the present invention. The polyolefin/clay nanocomposites prepared in accordance with one aspect of the present invention by attaching polyolefin to nanoclay via chemical bonding is thermodynamically, kinetically, and phase stable and is resistant to restacking and re-agglomeration in post polymerization processing. The present invention overcomes problems caused by nanoclay layers restacking during melt mixing and other post-polymerization processes, as observed in the prior art.

According to one aspect of the present invention, the value of (m+n+p) in the formula (A) in the olefinic functionalized surfactant should be over 2, preferably not less than 3. Preferably, the value of (m+n+p) should be less than 1,000, more preferably less than 200, even more preferably less than 100, and most preferably less than 50. Surfactants of formula (A) having a functional group M comprising an organic cation are preferred. Such preferred surfactants include, but are not limited to, $CH_2=CH-(CH_2)_4-COO-(CH_2)_4N^+(CH_3)_3Cl^-$, $CH_2=CH-CH_2-COO-(CH_2)_4N^+(CH_3)_3Cl^-$, $CH_2=CH-(CH_2)_7N^+(CH_3)_3Cl^-$, $CH_2=CH-(CH_2)_{16}N^+H(CH_3)_2Br^-$, $CH=CH-(CH_2)_4-COO-(C_2H_4)P^+(C_8H_{17})_3Cl^-$, and derivatives thereof.

The clays that can be used in accordance with this invention are not generally limited. Desirably, the clays used in accordance with the present invention are capable of forming polyolefin/clay nanocomposites when used in processes of the invention. Preferably, the clays used in accordance with the present invention are capable of forming polyolefin/clay nanocomposites exhibiting substantially exfoliated structure when used in processes of the invention. More preferably, the clays used in accordance with the present invention are capable of forming polyolefin/clay nanocomposites exhibiting substantially exfoliated structure that is phase and thermally stable when used in processes of the invention. According to one embodiment, the clay materials used in the invention are layered clay minerals having a layer thickness of about 1 nanometer and about 1 nanometer interlayer spacing and having absorbed cation(s) between layers with cation exchange capacity (CEC) of between about 70 to about 120 mmol/100 g. The clays can be natural or can be synthesized by chemical reactions, and include, but are not limited to, montmorillonite, smectite, saponite, beidellite, laponite, hectorite, montionite, stevensite, diatomaceous earth, vermiculite, hallosite, layered silicates, zeolites. Combinations of different clays can be used in accordance with the present invention. Montmorillonite (mmt) clay materials are a preferred embodiment as are clay combinations comprising montmorillonite.

In accordance with one aspect of the invention, the olefinic functionalized organoclay is prepared by the following process: (1) suspending clay in water or mixture of water and hydrophilic organic solvent at between 30 and 120° C. at a weight ratio of water/clay of about 1:1 to about 20:1 and reacting with the olefinic functionalized surfactant at a weight ratio of surfactant to clay of about 0.1:1 to about 5:1; and (2) washing the product with de-ionized water sufficiently to remove unreacted olefinic functionalized surfactant followed by filtering and vacuum drying. The olefinic functionalized organoclay is intercalated and contains about 1 to about 120 mmol surfactant per 100 g clay.

In accordance with one aspect of the present invention, the polyolefin/clay nanocomposite comprises about 40 to 99.9% polyolefins by weight and about 0.1 to 60% of selected clay by weight.

In accordance with one aspect of the present invention, the preparation of polyolefin/clay nanocomposites involves (1) the reaction of clay with the olefinic functionalized surfactant to form the olefinic functionalized organoclay; (2) the incorporation of a $MgCl_2$ supported Ziegler-Natta catalyst precursor, soluble Ziegler-Natta catalyst precursor, metallocene catalyst precursor, or late transition metal catalyst precursors into the gallery of the olefinic functionalized organoclay; and (3) the polymerization of an olefin in the presence of the olefinic functionalized organoclay incorporated catalyst precursor; cocatalyst, e.g., trialkylaluminum; and optionally external electron donor.

A basic schematic illustration of a process for making polyolefin/clay nanocomposites in accordance with one aspect of the present invention is depicted in FIG. 1.

Depending on the catalyst system used, the catalyst precursor can be formed inside the clay gallery in-situ via catalyst preparation reactions or can be directly deposited from a pre-prepared catalyst solution.

In accordance with one aspect of the present invention, the incorporation of a Ziegler-Natta catalyst component containing magnesium halogen compound; transition metal compound, which is desirably a titanium compound; and electron donor (internal electron donor) into the gallery of an olefinic functionalized organoclay follows the following steps: (1) reacting a magnesium compound in non-polar hydrocarbon solvents with one or more Lewis bases at about 20° C. to about 200° C. to form a uniform solution; (2) treating the solution from (1) with internal electron donor at a mole ratio of electron donor/magnesium compound of about 0 to 1:1; (3) adding olefinic functionalized organoclay at a weight ratio of clay/magnesium compound of from about 1:1 to about 50:1 and allowing a reaction to proceed at about 60° to 130° C. for 2 to 24 hours; (4) adding transition metal compound at a mole ratio of transition metal/Mg from about 1:1 to about 100:1 and maintaining at from about −20° to 0° C. for 0.5 to 4 hour; (5) heating the mixture to from about 80° to 130° C. and reacting with internal electron donor at donor/magnesium mole ratio of about 0 to 1:1 for 2 to 6 hours, followed by hot-filtering and collection of the solid portion; (6) suspending the solid powder from step-6 into an air-free solvent and reacting with transition metal compound at a mole ratio of transition metal/Mg from about 1:1 to about 100:1 and stirring for 2 to 8 hours. After hot-filtering and washing, a solid component is obtained containing 0.5 to 20 wt % transition metal and 0.1 to 90 wt % clay.

In such embodiments, acceptable magnesium compounds include, but are not limited to, magnesium alkyls; magnesium alkyl halides; magnesium halides, such as magnesium chlorides, magnesium bromide, magnesium iodide and magnesium fluoride; $C_1$-$C_{12}$ alkoxy magnesium halides; magnesium alkoxides; and aryloxy magnesium halides. Magnesium halides are preferable.

In the preparation of the magnesium compound solution, various non-polar hydrocarbon solvents are used, including, but not limited to, aliphatic hydrocarbons, such as pentane, hexane, heptane, octane, decane, dodecane, tetradecane and kerosene; alicyclic hydrocarbons, such as methylcyclohexane, cyclopentane, methylcyclopentane, cyclohexane, cyclooctane and cyclohexene; aromatic hydrocarbons, such as benzene, toluene, xylene, ethylbenzene, cumene and cymene; and halogenated hydrocarbons, such as dichloroethane, dichloropropane, trichloroethylene, carbon tetrachloride and chlorobenzene.

As indicated, halogen containing magnesium compounds are preferred. Magnesium halide solution may be prepared by reacting magnesium halides with one or more Lewis base compounds in the above mentioned solvent. Acceptable Lewis base compounds include, but are not limited to, alcohols; ethers, including cyclic ethers such as THF; and esters. The Lewis base/Mg molar ratio is preferably in the range of about 1:1 to about 10:1. Alcohols that can be used include, but are not limited to, methyl alcohol, ethyl alcohol, 2-ethylhexyl alcohol, n-propyl alcohol, butyl-alcohol, n-amyl alcohol, isobutyl alcohol, isopropyl alcohol, n-octyl alcohol, and isopropyl alcohol.

In various embodiments, the transition metal compounds are selected from the group consisting of titanium, vanadium, and chromium compounds having the following structural formula, $M^1(OR^4)_g X_{4-g}$, where $M^1$ is selected from titanium, vanadium, and chromium, X is a halide, g is a number represented by $0 \leq g \leq 3$, each $R^4$ is independently a hydrocarbon group of $C_1$-$C_{10}$. Titanium compounds are preferred, and $TiCl_4$ is more preferable.

In accordance with various embodiments of the invention, an internal electron donor can be employed. Preferred internal electron donors are Lewis bases, such as an esters or diethers. Acceptable esters are $C_6$-$C_{30}$ aliphatic polycarboxylic acid esters, $C_{10}$-$C_{30}$ alicyclic polycarboxylic acid esters, $C_{10}$-$C_{30}$ aromatic polycarboxylic acid esters, $C_8$-$C_{30}$ heterocyclic polycarboxylic acid esters, or an ester formed between a $C_6$ to $C_{16}$ aromatic polyhydroxyl compound and a $C_1$ to $C_{12}$ aliphatic carboxylic acid.

In accordance with various embodiments of the present invention, the polyolefin/clay nanocomposites can be prepared by in-situ polymerization of olefin monomers in the presence of the olefinic functionalized organoclay with incorporated Ziegler-Natta catalyst precursor, as described above, and a cocatalyst, and optionally with an external electron donor at a temperature of from about 20° C. to about 100° C. under-pressure from about 0.01 to about 50 Mpa. Desirable olefins for use in the invention include $C_2$ to $C_{10}$ alpha-olefins, including, but not limited to, ethylene, propylene, 1-butene, 1-pentene, 1-hexene, 4-methyl-1-pentene, and 1-octene. Mixtures of olefins can be used.

Cocatalyst can be selected from the organoaluminum group, which includes triethylaluminum, tri-n-propylaluminum, tri-iso-butylaluminum, tri-n-octylaluminum, tri(2-methylpentyl) aluminum, di-iso-butylaluminum hydride, ethylaluminum sesquichloride, diethylaluminum chloride, ethylaluminum dichloride, diethylaluminum ethoxide, diethylaluminum iodide, methylaluminoxane, and ethylaluminoxane. Triethylaluminum is particularly preferable. The molar ratio of the organoaluminum compound to the transition metal of the catalyst precursor component may range from about 1000:1 to about 0.5:1.

In accordance with various embodiments of the invention, an external electron donor may be used. An external electron donor may be desirable, for example, when polypropylene/clay nanocomposites are prepared. Acceptable external electron donors include organosilane compounds, including, but not limited to, those with an Si—O—C or Si—N—C bond structure or those with the following formula: $(R^6)_o Si (OR^5)_{4-o}$, wherein $R^6$ represents a $C_1$ to $C_{10}$ alkyl group, a $C_5$ to $C_{12}$ cycloalkyl group, a $C_6$ to $C_{10}$ aryl group, a $C_1$ to $C_{10}$ alkenyl group, a $C_1$ to $C_{10}$ haloalkyl group, or a $C_1$ to $C_{10}$ amino group; $R^5$ represents a $C_1$ to $C_{10}$ alkyl group, a $C_6$ to $C_{12}$ cycloalkyl group, a $C_6$ to $C_{20}$ aryl group, a $C_1$ to $C_{10}$ alkyl group, or a $C_2$ to $C_{16}$ alkoxyalkyl group; "o" is a number represented by $0 \leq o \leq 3$, and each $R^6$ group and each $R^5$ group may be identical or different. Desirably, the mole ratio of external electron donor to aluminum of the cocatalyst is from about 0 to 1:1.

In various embodiments of the present invention, metallocene catalysts or late transition metal catalyst can also be used to prepare the polyolefin/clay nanocomposites. Such catalyst systems are particularly desirable for polyethylene/clay nanocomposites. Acceptable metallocene catalyst precursors include, but are not limited to, dicyclopentadienyl zirconium dichloride, alkyl substituted dicyclopentadienyl zirconium dichloride, dimethylsilylbis(2-methyl-4-(1-napthyl) indenyl zirconium dichloride, and dimethylsilylbis (2-methyl-4-(1-napthyl)indenyl zirconium dichloride. Acceptable late transition metal catalyst precursors include, but are not limited to [2-acetyl(2,6-diisopropylanil)-6-phenyl (2'-methoxy)-pyridine]iron dichloride, [2-acetyl(2,4,6-trimethylanil)-6-phenyl(2'-methoxy)-pyridine]iron dichloride, [2-acetyl(2,3,4,5,6-pentafluoroanil)-6-phenyl(2'-methoxy)-pyridine]-iron dichloride, [2-acetyl(2,3,4,5,6-pentafluoroanil)-6-phenyl(2'-methoxy)-pyridine]-cobalt dichloride, [2-acetyl(2,3,4,5,6-pentafluoroanil)-6-phenyl(2'-methoxy)-pyridine]-nickel dichloride.

A procedure for treatment of an olefinic functionalized organoclay with metallocene catalyst precursor or late transition metal catalyst precursors is as follows: (1) treating the olefinic functionalized organoclay with methylaluminoxane (MAO, 10 wt % in toluene) or alkyl aluminum hexane solution in a ratio of 0.01 to 10 g clay per milliliter, and stirring the mixture at 0-100° C. for 0.5 to 3 hours; (2) dispersing the mixture with metallocene catalyst precursor or the late transition metal catalyst precursor in toluene, and stirring for 0.5 to 3 hours at 30-100° C., followed by filtering and drying to obtain solid component. The polyolefin/clay nanocomposites can then be prepared by in-situ polymerization of olefins in the presence of the organoclay incorporated metallocene or late transition metal catalyst precursors and orgnoaluminum complex as a cocatalyst. The organoaluminum cocatalyst is desirably selected from the organoaluminum compounds previously described or from alkylaluminoxane compounds containing $[-Al(R^7)-O-]_n$, wherein $R^7$ is a $C_1$ to about $C_{10}$ hydrocarbon group, and n is a number from about 1 to about 100. Such alkylaluminoxane compounds include, but are not limited to, methylaluminoxane, ethylaluminoxane, butylaluminoxane. Methylaluminoxane (MAO) is particularly preferred.

The degree of polymerization of the polyolefin/clay nanocomposite can be measured according to conventional methods. Nucleic Magnetic Resonance Spectroscopy (NMR) and Fourier Transform Infrared Spectroscopy (FTIR) have been used to measure the presence of residual double bonds in polyolefin samples. The presence or absence of double bonds provides an indication of whether the olefinic functionalized nanoclay has been incorporated into the polymer chain. Differential scanning calorimetry (DSC) can be used to measure the melting point and $\Delta H$ of a polyolefin matrix. Both the melting point and $\Delta H$ for a polymer matrix with olefinic functionalized nanoclay incorporated will be lower than a polymer matrix that does not have functionalized nanoclay incorporated therein.

X-ray diffraction (XRD) can be used to characterize the nanostructure. If diffraction peaks are observed in the low-angle region, such peaks indicate the (001) d spacing (basal space) of ordered-intercalated composites. If the nanocomposites are completely exfoliated (disordered), no peak will be observed due to loss of the parallel registry of the layers. If the exfoliated or intercalated clay platelets were not phase stable or thermally stable, the clay platelets would reorganize and agglomerate into a separate phase after post-polymerization processing, such as molding, and the diffraction peak would reappear. As can be observed from FIG. 2E, this re-stacking phenomenon does not happen in polyolefin/clay nanocomposites prepared in accordance with the present invention.

XRD diffraction patterns representative of different steps in the preparation of polyolefin/clay nanocomposites of the present invention are illustrated in FIGS. 2A-2E: pristine montmorillonite clay (FIG. 2A), olefinic functionalized organoclay (FIG. 2B), treated organoclay with Ziegler-Natta catalyst (FIG. 2C), polypropylene/clay nanocomposite prepared in Example 3 (FIG. 2D), and polypropylene/clay nanocomposite film prepared in Example 3 polymer and molding polymer (FIG. 2E). The pristine montmorillonite clay has $Na^+$ cation and the (001) peak is at $2\theta=7.10$. While the olefinic functionalized surfactant have been intercalated into the gallery of clay, the (001) peak of olefinic functionalized clay is shifted to $2\theta=4.8$. In polyolefin/clay nanocomposites prepared in accordance with the present invention, the characteristic peak of (001) d-spacing disappears in both the virgin polyolefin/clay nanocomposites polymer sample (FIG. 2D) and in film samples of the polyolefin/clay nanocomposites after melting molding processing (FIG. 2E), indicating that the organoclay has been exfoliated and dispersed homogenously in the polyolefin matrix and has good phase stability.

Heat resistance and thermal stability are also measured. The heat decomposition temperature of polymer samples is measured by TGA. As demonstrated by the embodied examples, the oxidative thermal stability of the polyolefin/clay nanocomposites of the present invention is significantly improved. The improved oxidative thermal stability is also indicative of improved gas barrier properties.

Additionally, the well-exfoliated and phase stable structure of the polyolefin/clay nanocomposites of the present invention is evident by the improvements in the mechanical properties of the nanocomposites. Such improvements include significant enhancement of tensile, flexure, and impact strength by a small amount of nanoclay in the polymer matrix.

To facilitate a better understanding of the present invention, the following examples of certain aspects of some embodiments are given. In no way should the following examples be read to limit, or define, the scope of the invention.

EXAMPLES

Example 1

Preparation of Olefinic Functionalized Organo-Montmorillonite

To a dried 500 mL flask equipped with a magnetic stirring bar, 100 g of montmorillonite clay, about 200 ml of distilled water and 41.6 g $CH_2=CH-(CH_2)_4-COO-(CH_2)_4-N^+(CH_3)_3Cl^-$ was added. After reacting for 6 hours at 80° C., the product was filtered and then washed with distilled water. The filtered reaction product was then washed 3 to 4 times with distilled water until there was no surfactant observed in the filtrate using a silver nitrate test. The resultant olefinic functionalized montmorillonite clay with chain end double bond was dried under vacuum at 100° C. until the weight of the solid remained constant. The content of $CH_2=CH-(CH_2)_4-COO-(CH_2)_4-N^+(CH_3)_3Cl^-$ in the organo-montmorrillonite is about 19.5 wt %.

Example 2

Treatment of Olefinic Functionalized Organo-Montmorillonite with Ziegler-Natta Catalyst To a dried 250 mL glass reactor equipped with a magnetic stirring bar, 2.0 g of $MgCl_2$, 4.5 mL of dried decane and 7.8 mL of refined 2-ethyl-1-hexanol were added under $N_2$ flow and stirred for 2 hours at 110° C. to obtain a homogenous transparent solution. Then, 0.50 g of 9,9-bis(methoxymethyl) fluorine (BMF), as internal electron donor, was added: into the reaction system and the mixture was stirred for 1 hour to give a transparent solution. To the $MgCl_2$-2-ethyl-1-hexanol solution, 3.2 g of olefinic functionalized organo-montmorillonite clay prepared from Example 1 and 30 mL toluene were added and then stirred at 60° C. for another 4 hours. After cooling to −20° C., 100 mL of $TiCl_4$ was added, followed by stirring for 2 hours at −20° C., followed by heating to 80° C. slowly over 2 hours. Then, 1.33 g of BMF was added to the reaction system followed by stirring for 5 hours at 80° C. Afterwards, the excess amount of $TiCl_4$ was filtered off. The reactor was charged with another 100 mL of $TiCl_4$ and stirred for 2 hours at 80° C. The excess amount of $TiCl_4$ was removed. The solid product obtained was washed 2 times with 50 ml of dried hexane, and then dried under vacuum. The content of titanium was determined to be 4.47 wt %.

Example 3

Preparation of Polypropylene/Montmorillonite Nanocomposite

To a dried 250 mL deoxygenated glass reactor equipped with mechanical stirrer, 100 mL of dried hexane, 5 mmol of $Al(C_2H_5)_3$ and 0.10 g of the Ziegler-Natta catalyst containing organoclay solid from Example 2 were charged under propylene flow. The reactor was heated to 40° C. to initiate the polymerization. Propylene was fed continuously into the reactor to maintain a constant pressure of at least $1.01\times10^5$ Pa during the polymerization. After 30 minutes, the polymerization reaction was quenched with 2 mL of acidic ethanol. The polypropylene/clay nanocomposite was washed with excess ethanol and then filtered and dried. 9.3 g polypropylene/clay nanocomposite was obtained. The catalyst activity was $1.99\times10^5$ g PP/molTi.h. The content of montmorillonite clay was 0.392 wt. % based on polymer matrix. The heptane-insoluble portion was 86.5 wt %. The polypropylene/clay nanocomposite material shows a featureless XRD pattern (FIG. 2D) and no peak appeared between 0° and 10°, indicating stable exfoliated clay structure in the polypropylene/montmorillonite nanocomposite. The exfoliated structure is maintained during melt processing and post-molding processing (FIG. 2E). The melting point of the polypropylene/clay nanocomposite was determined by DSC to be 155.9° C. The decomposition temperature of the polypropylene/clay nanocomposite was determined by TGA to be 439.8° C.

Comparative Example 1

A solid catalyst component was prepared in the same manner as in Example 2 except the olefinic functionalized organo-montmorillonite clay was not added. The polymerization of propylene was carried out in the same manner as in the Example 3 using 0.1 g of the catalyst (without the organoclay). 9.0 g of polypropylene homopolymer was obtained, and the activity of the catalyst was $2.56\times10^5$ g PP/molTi.h. The heptane insoluble portion was 93.5 wt %. The melting point of the polymer was determined by DSC to be 159.9° C. The decomposition temperature of the polymer was measured by TGA to be 380.5° C.

Example 4

To a dried 1-liter autoclave reactor equipped with mechanical stirrer, 250 mL purified hexane, 7.2 mmol of $Al(C_2H_5)_3$, 1 mmol of dimethyl dimethoxy silane (DDS), and 100 mg of Ziegler-Natta catalyst treated olefinic organoclay in Example 2 were charged under nitrogen flow. The reactor was heated up to 50° C. The pressure was raised to 10 Psi with hydrogen, and then propylene was introduced to maintain total pressure at 80 Psi to initiate the polymerization. Propylene was fed continuously into the reactor to maintain a constant pressure during the polymerization. The polymerization was carried out for 1 hour. The polymerization reaction was quenched with acidic ethanol. The polymer was filtered and dried under vacuum. 70.6 g of polypropylene/clay nanocomposite was obtained, and the catalytic activity was 10.1 g PP/gcat.h.psi. The montmorillonite clay content in the polypropylene nanocomposite was 0.11 wt %. The heptane insoluble portion was 97.9 wt %. The melt index of the nanocomposite was 0.373, which was measured at 230° C. under a weight of 2.16 kg. The impact strength of the nanocomposite was 55.1 J/m measured by an Izod impact strength tester (CSI-137C) according to ASTM D256. The flexure strength was 52.7 Mpa and the flexure modulus was 1521.8 Mpa measured by Instron 3365 according to ASTM D790. The polypropylene nanocomposite shows a featureless XRD pattern, indicating stable exfoliated clay structure in the polypropylene/montmorillonite nanocomposite. The exfoliated structure is maintained after melt processing and post-molding processing.

Comparative Example 2

A solid catalyst component was prepared in the same manner as in Example 2 except the olefinic functionalized organomontmorillonite clay was not added. The polymerization of propylene was carried out in the same manner as in the Example 4 using 0.1 g of the catalyst (without the organomontmorillonite). 79.1 g of polypropylene was obtained, and the catalytic activity was 11.3 g PP/gcat.h.psi. The heptane insoluble portion was 97.9 wt %. The melt index of the polypropylene was 0.51 (measured at 230° C.). The impact strength of the polypropylene was 39.6 J/m measured by an Izod impact strength tester (CSI-137C) according to ASTM D256. The flexure strength was 46.2 Mpa and the flexure modules was 1171.4 Mpa measured by Instron 3365 according to ASTM D790.

Example 5

Treatment of Olefinic Organo-Montmorillonite with Ziegler-Natta Catalyst

To a dried 250 mL glass reactor equipped with a magnetic stirring bar, 1.6 g of $MgCl_2$, 4.5 ml of dried decane and 7.8 ml of refined 2-ethyl-1-hexanol were added under $N_2$ flow and stirred for 2 hours at 110° C. to obtain a homogenous transparent solution. 0.50 g of 9,9-bis(methoxymethyl)fluorine (BMF), as internal electron donor, was added into the reaction system and the mixture was stirred for 1 hour to give a transparent solution. To the $MgCl_2$-2-ethyl-1-hexanol solution, 3.2 g of olefinic organo-montmorillonite prepared from Example 1 and 30 mL toluene were added and then stirred at 60° C. for another 4 hours. After cooling to −20° C., 100 ml of $TiCl_4$ were added, followed by stirring for 2 hours at −20+ C. The system was then warmed up to 80° C. slowly over 2 hours. 1.33 g of BMF was added to the reaction system followed by stirring for 5 hours at 80° C. Afterwards, the excess amount of $TiCl_4$ was filtered off. The reactor was charged with another 100 mL of $TiCl_4$ and stirred for 2 hours at 80° C. The excess amount of $TiCl_4$ was removed. The solid product obtained was washed for 2 times with 50 ml of dried hexane, and then dried under vacuum. The content of titanium was determined to be 9.47 wt % by ICP method.

Example 6

Preparation of Polypropylene/Clay Nanocomposite

To a dried 250 mL deoxygenated glass reactor equipped with mechanical stirrer, 100 ml of dried hexane, 2.9 ml of $Al(C_2H_5)_3$ (Al/Ti molar ratio is 50) and 53 mg of the Ziegler-Natta catalyst treated organoclay solid of Example 5 were charged under propylene flow. The reactor was heated to 40° C. to initiate the polymerization. The propylene was fed continuously into the reactor to maintain a constant pressure of $1.01 \times 10^5$ Pa during the polymerization. After 5 minutes, the polymerization reaction was quenched with 2 mL of acidic ethanol. The polypropylene/clay nanocomposite was washed with excess ethanol, and then filtered and dried. The content of montmorillonite clay was 2.9 wt. %. The polypropylene/clay nanocomposite material shows a featureless XRD pattern, indicating stable exfoliated clay structure in the polypropylene/montmorillonite nanocomposite.

Example 7

Treatment of Olefinic Organoclay with Ziegler-Natta Catalyst

To a dried 250 ml reactor equipped a magnetic stirring bar, 1.0 g of $MgCl_2$, 40 ml of refined 1-butanol were added under $N_2$ flow and stirred for 2 hours at 60° C. to obtain a homogenous transparent solution. To the $MgCl_2$-butanol solution, 4.0 g of olefinic functionalized montmorillonite from Example 1 was added. The solution is stirred at 60° C. for 2 hours. Afterwards, the excess amount of 1-butanol is filtered off. The solid product was washed with 50 mL dried hexane for 3 times, and then 50 mL of dried hexane and 50 mL of $TiCl_4$ were charged under nitrogen flow. After 2 hours at 80° C., the excess $TiCl_4$ was filtered off. The solid powder obtained was washed 5 times with 50 mL dried hexane, and then dried under vacuum. The content of titanium was determined to be 3.78 wt %

Example 8

Preparation of Polyethylene/Clay Nanocomposite

To a dried 250 mL deoxygenated glass reactor equipped with mechanical stirrer, 100 ml of dried hexane, 5 mmol of $Al(C_2H_5)_3$ and 0.10 g of the Ziegler-Natta catalyst treated organoclay solid from Example 7 were charged under ethylene flow. The reactor was heated up to 40° C. to initiate the polymerization. The ethylene was fed continuously into the reactor to maintain a constant pressure of $1.01 \times 10^5$ Pa during the polymerization. After 30 minutes, the polymerization reaction was quenched with 2 mL of acidic ethanol. The polyethylene/clay nanocomposite was washed with excess ethanol, then filtered and dried under vacuum. 6.0 g of polyethylene/clay nanocomposite was obtained. The catalyst activity was 1.52×10⁵ gPE/molTi.h. Montmorillonite content of the nanocomposite material thus obtained was 0.8 wt %. The polyethylene/clay nanocomposite material shows a featureless XRD pattern, indicating stable exfoliated clay structure in the polyethylene/montmorillonite nanocomposite. The exfoliated structure is maintained during melt processing and post-molding processing. The melting point of the polyethylene/clay nanocomposite was determined by DSC to be 130.5° C. The decomposition temperature of the polyethylene/clay nanocomposite was measured by TGA to be 482.2° C.

Comparative Example 3

A solid catalyst component was prepared in the same manner as in Example 8 except the olefinic functionalized organomontmorillonite clay was not used. The polymerization of ethylene was carried out in the same manner as in the Example 7 except that 0.1 g of the catalyst (without treated organoclay) was used. 6.5 g of polyethylene was obtained. The catalyst activity was 1.78×10⁵ g PE/mol Ti.h. The melting point of the polymer was determined by DSC to be 131.8° C. The decomposition temperature of the polymer was measured by TGA to be 438.0° C.

Example 9

Preparation of Olefinic Functionalized Organoclay

To a dried 500 mL flask equipped with a magnetic stirring bar, 100 g of montmorillonite clay, 200 mL water, and 28.5 g of $CH_2=CH-(CH_2)_7-N^+(CH_3)_3Cl$ was added. After reacting for 6 hours at 80° C., the product was filtered and then washed with distilled water. The filtered reaction product was then washed 4 times with distilled water until there is no surfactant-observed in the filtrate using a silver nitrate test. The resultant olefinic functionalized montmorillonite with chain end double bond was dried under vacuum at 100° C. until the weight of the solid remained constant. The content of $CH_2=CH-(CH_2)_7-N^+(CH_3)_3Cl$ in the organo-montmorillonite is about 21.2 wt %.

Example 10

Treatment of Olefinic Organoclay with Metallocene Catalyst

To a dried 250 mL flask equipped with a magnetic stirring bar, 10 mL of dried hexane, 0.3 g of the modified clay obtained in Example 9, and 3.0 ml of MAO (10 wt. % in toluene), were added under $N_2$ flow. After stirring for 1 hour at 25° C., solvent was removed at reduced pressure. 10 ml of dried toluene was added to disperse the mixture. To the reaction slurry, 2.5 μmol of metallocene $Et(Ind)_2ZrCl_2$ was added, and stirred for 1 hour at 70° C. to give the organoclay-supported metallocene catalyst.

Example 11

Preparation of Polyethylene/Clay Nanocomposite

To a dried 500 mL deoxygenated glass reactor equipped with mechanical stirrer, 100 mL of dried toluene, and 1.0 mL of methylaluminoxane (MAO) and 0.3 g of organoclay-supported metallocene catalyst obtained in Example 10 was charged under ethylene flow. The reactor was heated up to 60° C. to initiate the polymerization. The ethylene was fed continuously into the reactor to maintain a constant pressure of 8.0×10⁵ Pa during the polymerization. After 60 minutes, the polymerization reaction was quenched with 20 mL of acidic ethanol. The polyethylene/clay nanocomposite was washed with excess ethanol, then filtered and dried under vacuum. The content of the montmorillonite clay was 3.8 wt % in the polyethylene/clay nanocomposite. The polyethylene nanocomposite material shows a featureless XRD pattern, indicating stable exfoliated clay structure in the polyethylene/clay nanocomposite. The exfoliated structure is maintained during melt processing and after post-molding processing.

The foregoing examples show that polypropylene/clay nanocomposites and polyethylene/clay nanocomposites in accordance with the present invention have higher heat resistance and improved mechanical properties, including, but not limited to, impact, flexure strength, and flexural modulus. The Ziegler-Natta catalyst containing intercalated clay component in this invention show high activity without deterioration of advantageous characteristics of polyolefin catalyst, including the catalyst stereoselectivity and polymer isotactic index.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A process for making exfoliated polyolefin/clay nanocomposite comprising:
   contacting clay with a polymerizable chain end double bond functionalized surfactant to form an olefinic functionalized organoclay;
   treating the olefinic functionalized organoclay with an olefin polymerization catalyst precursor; and
   polymerizing at least one olefin in the presence of the treated organoclay and an organoaluminum cocatalyst.

2. The process of claim 1, wherein an external electron donor is present during the polymerization.

3. The process of claim 1, wherein the polymerizable chain end double bond functionalized surfactant comprises

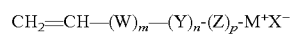

$CH_2=CH-(W)_m-(Y)_n-(Z)_p-M^+X^-$ where M is an onium moiety that has ion-exchange capability with alkali ions on the layer surface of clay; X is an anion; W is a repeating unit selected from $CH_2$, CRR', non-aromatic cyclic, and aromatic species, where R and R' are independently selected from hydrogen and hydrocarbon groups; m is between 1 and about 1000; Y is a repeating unit selected from hydrocarbon and functionalized hydrocarbon groups; n is between 0 and about 5; Z is a repeating unit selected from $CH_2$, CR"R'", cyclic, and aromatic species, where R" and R'" are independently selected from hydrogen, hydrocarbon groups, and functionalized hydrocarbon groups; p is between 1 and about 20; and (m+n+p) is greater than 2.

4. The process of claim 1, wherein the clay is selected from the group consisting of montmorillonite, smectite, saponite, beidellite, laponite, hectorite, montionite, stevensite, vermiculite, hallosite, diatomaceous earth, mica, layered silicates, zeolites, and combinations thereof.

5. The process of claim 1, wherein the olefin polymerization catalyst precursor is selected from the group consisting of Ziegler-Natta catalyst precursors, metallocene catalyst precursor, and late transition metal catalyst precursors.

6. The process of claim 1, wherein the catalyst precursor is formed in-situ via catalyst preparation reactions.

7. The process of claim 5, wherein the Ziegler-Natta catalyst precursor is formed in-situ in presence of the olefinic functionalized organoclay and hydrocarbon solvent by a process comprising: i) contacting a magnesium compound with a Lewis base in non-polar hydrocarbon solvent to form a solution; (ii) treating the solution from (i) with an internal electron donor; (iii) adding the olefinic functionalized organoclay; (iv) adding transition metal compound; and (v) adding an internal electron donor.

8. The process of claim 7, wherein the transition metal compound is selected from the group consisting of titanium, vanadium, and chromium compounds having the following structural formula, $M^1(OR^4)_g X_{4-g}$, where $M^1$ is selected from titanium, vanadium, and chromium, X is a halide, g is a number represented by $0 \leq g \leq 3$, and each $R^4$ is independently a hydrocarbon group of $C_1$-$C_{10}$.

9. The process of claim 7, wherein the magnesium compound is selected from the group consisting of magnesium halides, magnesium alkoxides, and magnesium alkyls.

10. The process of claim 7, wherein the Lewis base comprises an alcohol.

11. The process of claim 10 wherein the alcohol comprises at least one of ethyl alcohol, 2-ethylhexyl alcohol, n-propyl alcohol, butyl-alcohol, or n-amyl alcohol.

12. The process of claim 7, wherein at least one of the internal electron donor of step (ii) and the internal electron donor of step (v) are selected from $C_6$-$C_{30}$ aliphatic polycarboxylic acid esters, $C_{10}$-$C_{30}$ alicyclic polycarboxylic acid ester, $C_{10}$-$C_{30}$ aromatic polycarboxylic acid esters, $C_8$-$C_{30}$ heterocyclic polycarboxylic acid esters, and esters formed between a $C_6$ to $C_{16}$ aromatic polyhydroxyl compound and a $C_1$ to $C_{12}$ aliphatic carboxylic acid.

13. The process of claim 2, wherein the external electron donor comprises $(R^6)^o Si(OR^5)_{4-o}$, wherein each $R^6$ is independently selected from the group consisting of $C_1$ to $C_{10}$ alkyls, $C_5$ to $C_{12}$ cycloalkyls, $C_6$ to $C_{10}$ aryls, $C_1$ to $C_{10}$ alkenyls, $C_1$ to $C_{10}$ haloalkyls, and $C_1$ to $C_{10}$ amino groups; wherein each $R^5$ is independently selected from
the group consisting of $C_1$ to $C_{10}$ alkyls, $C_6$ to $C_{12}$ cycloalkyls, $C_6$ to $C_{20}$ aryls, $C_1$ to $C_{10}$ alkyls, and $C_2$ to $C_{16}$ alkoxyalkyls; and wherein $0 \leq o \leq 3$.

14. The process of claim 3, wherein M is selected from ammonium, sulfonium, phosphonium, and oxonium species of the structure $C^+(R^1)_a(R^2)_b(R^3)_c$, where C is selected from the group consisting of nitrogen, sulfur, phosphorus, and oxygen; $R^1$, $R_2$ and $R^3$ are independently selected from hydrogen, hydrocarbon, and functionalized hydrocarbon species; subscripts a, b, and c are numbers from 0 to 3 with $(a+b+c) \leq 3$.

15. The process of claim 3, wherein the surfactant is selected from $CH_2=CH-(CH_2)_4-COO-(CH_2)_4N^+(CH_3)_3Cl^-$, $CH_2=CH-CH_2-COO-(CH_2)_4N^+(CH_3)_3Cl^-$, $CH_2=CH-(CH_2)_7-N_+(CH_3)_3Cl^-$, $CH_2=CH-(CH_2)_{16}N^+H(CH_3)_2Br^-$, or $CH=CH-(CH^2)^4-COO-(C_2H_5) P^+(C_8H_{17})_3Cl^-$, and combinations thereof.

16. The process of claim 14, where M is selected from $-N^+H(CH_3)_2$, $-N^+H_2(CH_3)$, $-N^+(CH_3)_3$, $-N^+(CH_3)(C_2H_5)_2$, $-S^+(CH_3)^2$, $-P^+(CH_3)_3$, and $-O^+(CH_3)_2$.

17. The process of claim 3, wherein M is selected from heterocyclic onium moieties.

18. The process of claim 17, wherein M is selected from imidazolinium, pyridium, pyrrolidinium, pyrrolium, pyrazolium, triazolium, pyrimidinium, pyridazinium, pyrazinium, trizinium, indolium, indazolium, benzimidazolium, quinolinium, isoquinollinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium moieties.

19. The process of claim 1, wherein the catalyst precursor is directly deposited from a pre-prepared catalyst solution.

* * * * *

UNITED STATES PATENT AND TRADEMARK OFFICE
CERTIFICATE OF CORRECTION

PATENT NO. : 7,432,319 B2  Page 1 of 1
APPLICATION NO. : 11/288623
DATED : October 7, 2008
INVENTOR(S) : Honglan Lu et al.

It is certified that error appears in the above-identified patent and that said Letters Patent is hereby corrected as shown below:

Claims:

Column 17 Line 23   delete "$0 \leqq g \leqq 3$" insert -- $0 \leq g \leq 3$ --

Column 18 Line 2    delete "$(R^6)^o Si(OR^5)_{4-o}$" insert -- $(R^6)_o Si(OR^5)_{4-o}$ --

Column 18 Line 9    delete "$0 \leqq g \leqq 3$" insert -- $0 \leq g \leq 3$ --

Column 18 Line 17   delete "$\leqq 3$" insert -- $\leq 3$ --

Column 18 Line 21   delete "$CH_2=CH-(CH_2)_7,N_+(CH_3)_3Cl^-$"
                    insert -- $CH_2=CH-(CH_2)_7 N^+(CH_3)_3 Cl^-$ --

Column 18 Line 22   delete "$CH=CH-(CH^2)^4-COO-(C_2H_5)P^+(C_8H_{17})_3Cl^-$"
                    insert -- $CH=CH-(CH_2)_4-COO-(C_2H_5)P^+(C_8H_{17})_3Cl^-$ --

Column 18 Line 26   delete "$-S^+(CH_3)^{2}$" insert -- $-S^+(CH_3)_2$ --

Signed and Sealed this

Twenty-fifth Day of November, 2008

JON W. DUDAS
*Director of the United States Patent and Trademark Office*